Oct. 27, 1942.                L. F. CLERC                2,300,345
                        REFRIGERATING CABINET
                    Filed Jan. 25, 1939        5 Sheets-Sheet 1
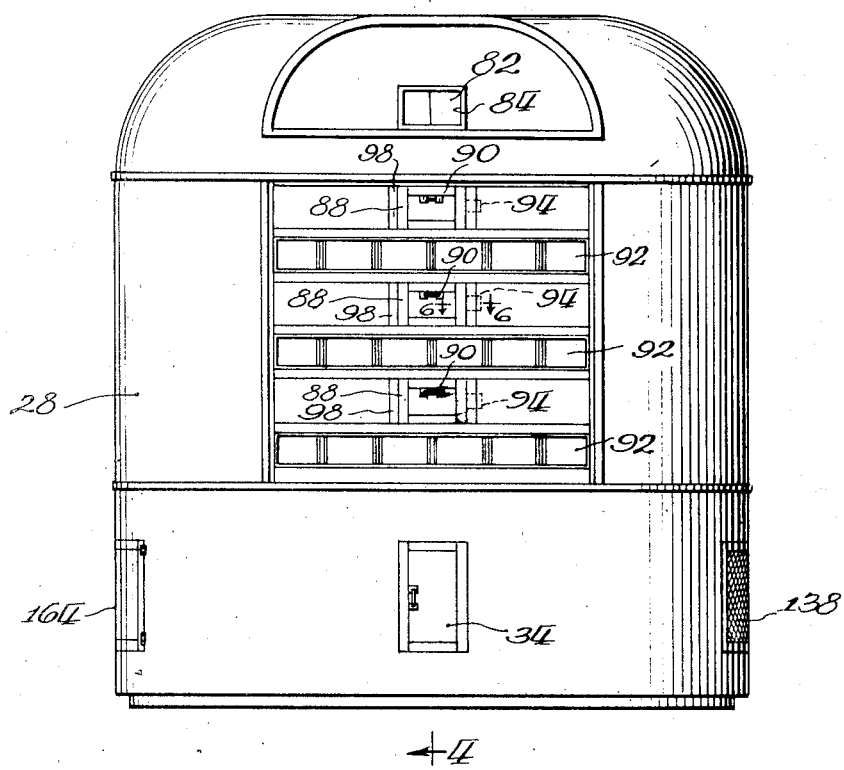
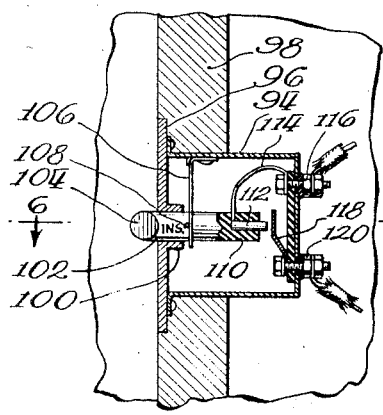
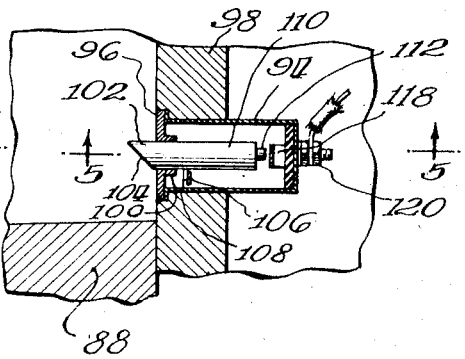
Inventor
Leonard F. Clerc

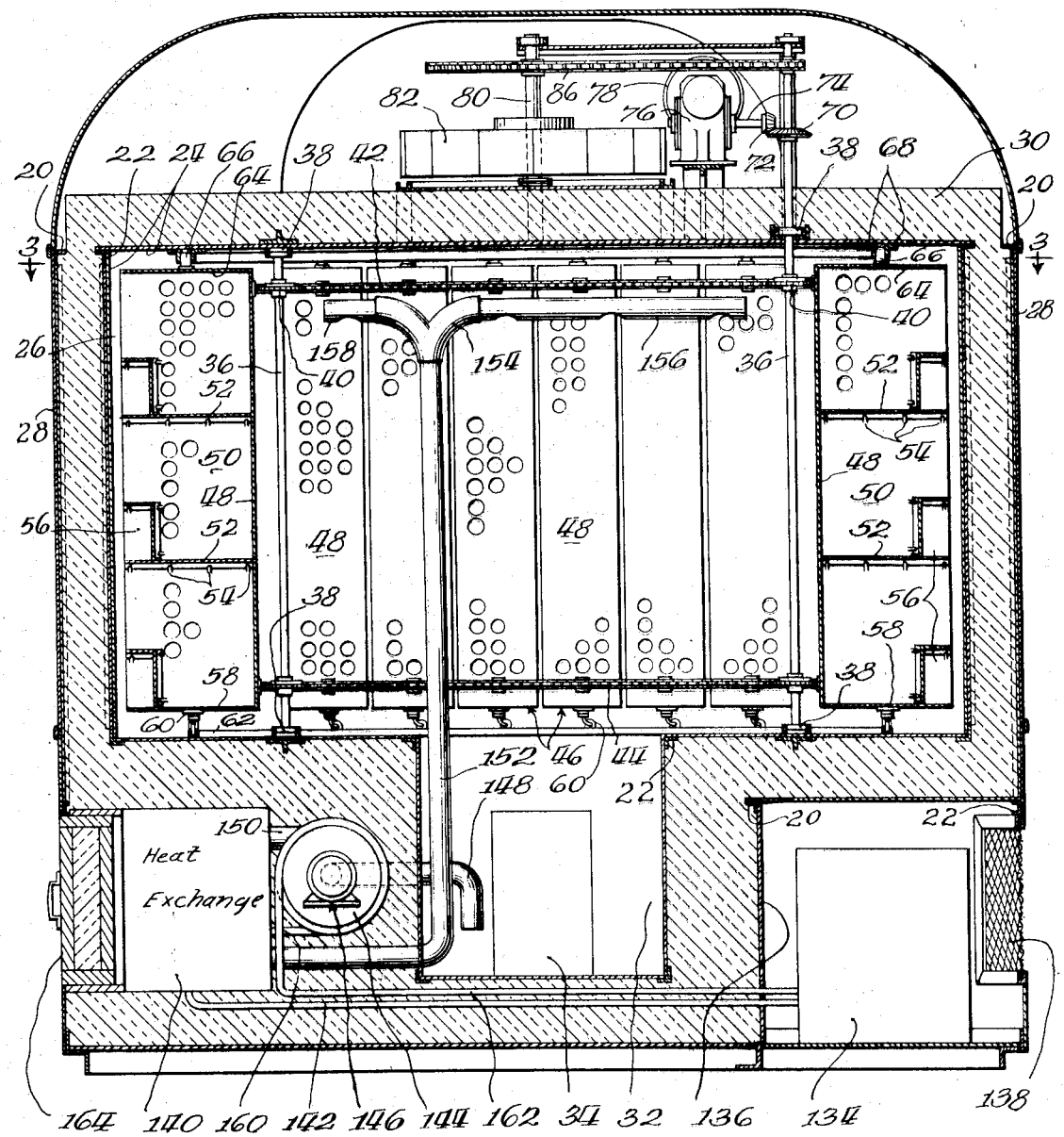

Oct. 27, 1942.  L. F. CLERC  2,300,345
REFRIGERATING CABINET
Filed Jan. 25, 1939   5 Sheets-Sheet 3

Inventor
Leonard F. Clerc
By Williams, Bradbury,
McCaleb & Hinkle
Attys.

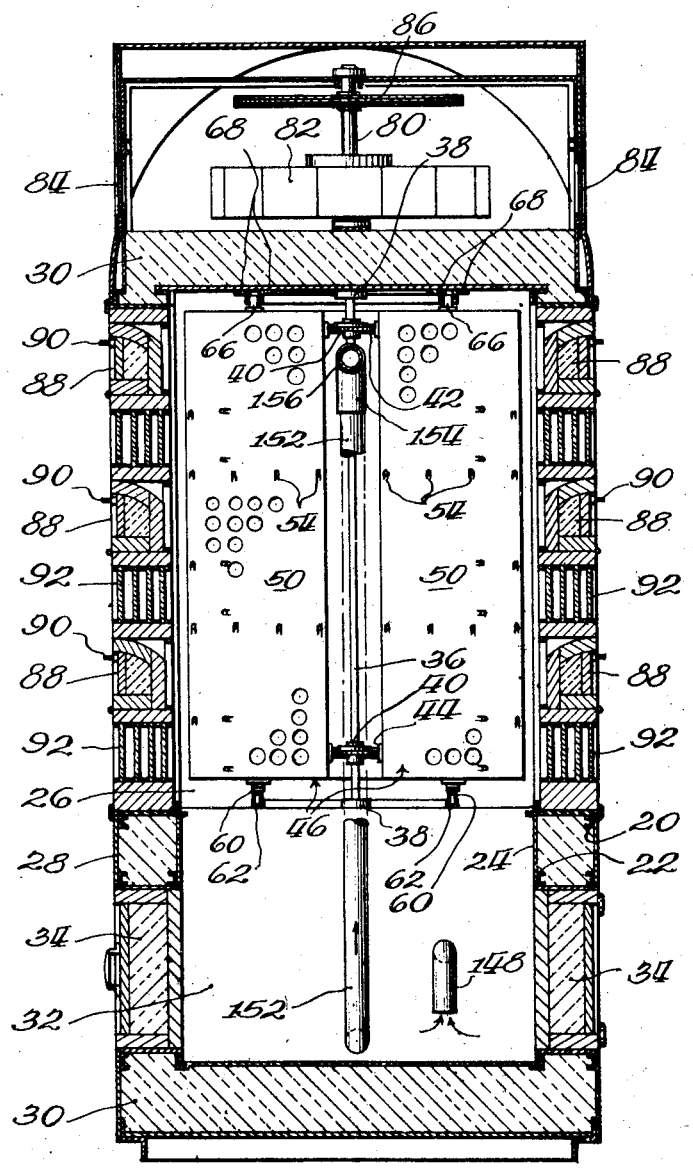

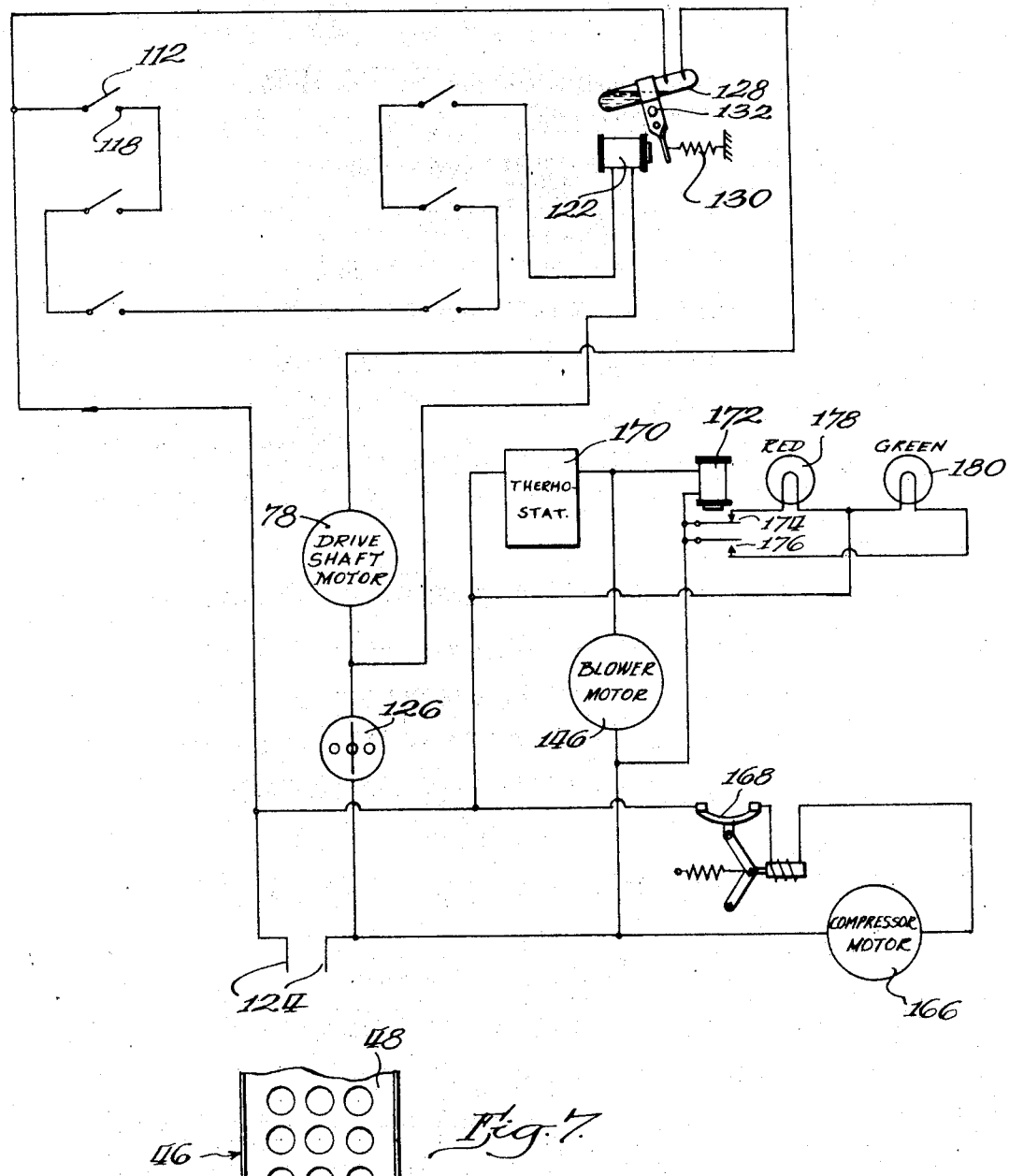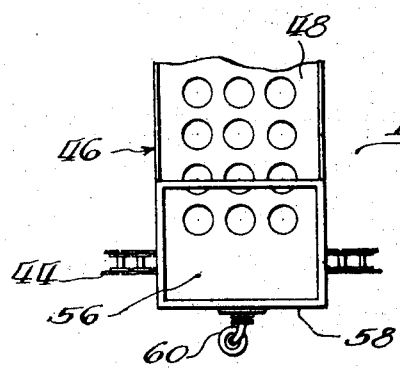

Patented Oct. 27, 1942

2,300,345

UNITED STATES PATENT OFFICE 2,300,345

REFRIGERATING CABINET

Leonard F. Clerc, Chicago, Ill.

Application January 25, 1939, Serial No. 252,707

7 Claims. (Cl. 312—134)

My invention relates generally to refrigerating cabinets, particularly cabinets useable in retail selling establishments for the storage, display, and dispensing of frozen foods, and foods which it is desirable to maintain at a low temperature. It is an object of my invention to provide a dispensing and display cabinet for use in the sale of frozen foods in which the customer may readily remove desired products from the cabinet, and in which the food products are so arranged and displayed that the customer may readily select any one of a large number of different products contained in the cabinet.

A further object is to provide an improved conveyor system for use in refrigerating cabinets, together with control means therefor, whereby the customer may have access to a large number of different products through a relatively small doorway formed in the cabinet.

A further object is to provide an improved refrigerating display cabinet for dispensing refrigerated foods and the like, having improved means for maintaining the food at the desired low temperature.

Other objects will appear from the following description, reference being had to the accompanying drawings, in which:

Figure 1 is a front elevation of the cabinet;

Figure 2 is a longitudinal vertical sectional view thereof taken on the line 2—2 of Figure 3;

Figure 4 is a vertical sectional view taken on the line 4—4 of Figure 1;

Figures 5 and 6 are fragmentary sectional views showing the door-operated switch;

Figure 7 is a fragmentary detail elevation of a food compartment; and

Figure 8 is a wiring diagram showing the various control circuits.

Figure 3:
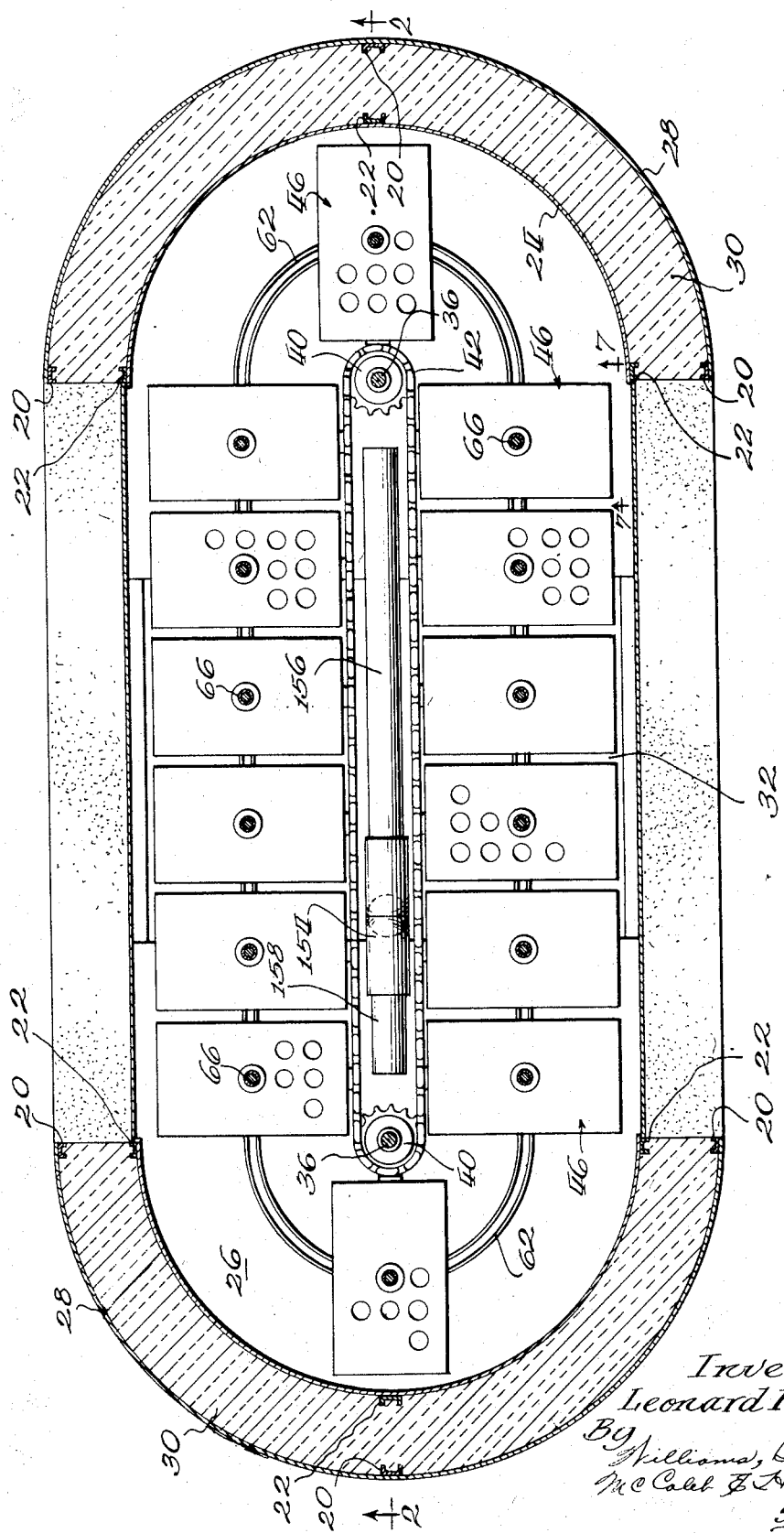
Figure 3 is a horizontal sectional view taken on the line 3—3 of Figure 2.

Considerable difficulty has been experienced in the past in the handling and retail sale of packaged frozen foods. Such foods should be stored at a relatively low temperature, lower than that customarily attained in the refrigerators utilized in grocery stores, meat stores, and the like. Furthermore, such refrigerating cabinets are usually provided with large doors which must be frequently opened by the store clerks to remove the products requested by the customers, thus admitting a relatively large quantity of warm air to the cabinet. Under these conditions it is very difficult to maintain a desirable low temperature in the refrigerating cabinet without the use of an excessively large refrigerating compressor and associated apparatus. Furthermore, in such cabinets as have been used in the past, the cooling of the food placed in the cabinet was usually accomplished by the circulation of air due to convection, the evaporator coils, or the brine coils usually being placed directly in the food compartment of the cabinet. In accordance with the principles of my invention, the cabinet includes a plurality of food carriers each provided with a plurality of shelves upon which the food products may be placed, the carriers being secured to a suitable conveyor chain and moved continuously or intermittently past relatively small doors which may be opened by the customer to obtain access to the food products. The conveyor chain which moves the carriers is motor driven and the circuit for the driving motor is controlled by the opening and closing of the doors so that the conveyor is stopped whenever one of the doors is opened.

The cabinet comprises an outer steel framework 20 and an inner steel framework 22 which are suitably spaced and separated by insulating material. The inner framework 22 is covered by metallic sheets 24 to form a food chamber 26 while the outer framework 20, which is made of angle irons and the like, is covered with suitable sheeting 28 which may be of steel or plywood. The insulating material 30 is packed between the sheets 24 and 28 so as thoroughly to insulate the food chamber 26 from the atmosphere. A storage compartment 32 is formed at the center and bottom of the food chamber 26 and is accessible through a door 34. Within the chamber 26 are a pair of vertical shafts 36 mounted in suitable thrust bearings 38 and carrying sprockets 40 (Figure 3). Endless chains 42, 44, engage the sprockets 40 and have attached thereto food product carriers 46. As shown in Figure 3 there are fourteen of these carriers 46, each having an inner vertical wall 48, which is attached to the chains 42, 44 adjacent its ends. The rear wall 48 of each of the food compartments, as well as its side walls 50, is formed of perforated or reticulated material such as sheet steel or heavy woven wire. A plurality of perforated shelves 52 is secured in each of the food carriers, being preferably supported by lugs 54 struck from the side walls 50 thereof. A small compartment 56 formed by suitable perforated sheet metal is provided on each of the shelves 52 as well as on the bottom 58 and is adapted to contain a sample package of the food which is packed in each section of the carrier. The bottom 58 of each of the carriers has a caster 60 secured thereto, the caster wheel rolling in a channel-shaped guiding track 62, while the top 64 of each of the carriers has a stud 66 which may be provided with a roller fitting between a pair of suitably conformed angle iron guides 68. Thus, upon rotation of the shaft 36, the food carriers will be moved in a circuitous path through the cabinet.

The shaft 36 extends through the insulation 30 above the top sheet 24 of the food compartment of the cabinet and has a driven bevel gear 70 secured thereto. The gear 70 is driven by a bevel pinion 72 attached to the drive shaft 74 of a reduction gearing contained in a housing 76, this gearing being driven by a motor 78.

A shaft 80 is mounted for free rotation at the center of the cabinet and has secured thereto a drum 82 forming an indicator having a plurality of faces upon which identifying indicia may be marked. The faces of the drum 82 are visible through a suitable window 84 formed in the front of the cabinet and the shaft 80 is driven through a chain 86 from the shaft 36 so that the drum 82 will rotate in synchronism with the movement of the food carriers and the legends on the drum may be made to indicate the kind of food packed in the correspondingly positioned carrier. The reduction gearing housing 76 and the shafts 80 and 36 are mounted in suitable supports and bearings as indicated in Figure 2.

The front and rear walls of the cabinet are each provided with three doors 88 which are hinged at their outer lower edges and are provided with handles 90. These doors are positioned at levels slightly above the tops of the sample display compartments 56, the contents of which may be observed by the customer through windows 92 formed in the front and rear walls of the cabinet. The windows 92 each include a series of spaced panes of glass which are hermetically sealed so as to prevent the admission of moisture-laden air to the space between them and the heat transmission through the windows is reduced by the stagnant air spaces between the panes of glass. It will be noted from Figure 1 that the windows 92 extend along the front, as well as the rear, of the cabinet a sufficient distance so that six of the sample food compartments of the carriers are visible at one time. The customer can thus observe the travel of the carriers, and open the proper door 88 when the compartment containing the desired food product is in registry with the door.

Means are provided to arrest the movement of the carriers whenever any one of the six doors 88 is opened. This means is diagrammatically illustrated in Figures 5 and 6 as comprising a switch box 94 recessed in the side jamb of each door, the box 94 being secured to a striker plate 96 which may be screwed or riveted to the door jamb 98. The striker plate is provided with a reentrant annular flange 100 forming a guide bearing for a plunger 102 which has a beveled end surface 104. The plunger is normally urged to its outermost position by a leaf spring 106 which is riveted to the housing 94 and engages a pin 108 extending transversely through the plunger. The plunger 102 has an extension 110 of insulating material secured thereto, this extension carrying a contact pin 112 connected by a wire 114 with a terminal 116. A contact spring 118 is secured to a terminal 120, both terminals 116 and 120 being suitably insulated from the switch box 94. It will be apparent from Figure 6 that as the door 88 moves from its open position to its closed position, it will cam the plunger 102 inwardly, causing the pin 112 carried thereby to make contact with the contact spring 118 and thus complete a circuit between the terminals 116 and 120.

As shown in Figure 8, the switch contacts 112—118, respectively provided for each of the six doors, are connected in series with the winding of a relay 122 and are normally connected to the current supply line 124 whenever the switch 126 is closed. Thus, upon closure of all the switches 112—118, the relay 122 will be energized and the mercury switch 128 carried by the armature of the relay 122 will close to complete a circuit from the line 124 to the motor 78. However, whenever any one of the doors 88 is opened, its associated switch 112—118 will be opened, the relay 122 de-energized, and the spring 130 associated with the armature of the relay 122 will swing the mercury switch 128 counterclockwise about its pivot 132 and thus break the mercury switch contacts, thereby opening the circuit to the motor 78. Inasmuch as the motor drives the carriers through the speed reducing gearing contained in the housing 76 and the carriers thus move relatively slowly, opening the circuit to the motor 78 will result in substantially instantaneous stoppage of the movement of the carriers so that the carriers will have come to a position of rest before the customer completes the opening of the door and the insertion of his hand for the removal of the package or packages of food which he desires to purchase. There is thus no danger of accidental injury to the customer.

The food within the cabinet is maintained at a very low temperature by a suitable refrigerating system illustrated as comprising a refrigerating unit 134 contained in a compartment 136 and accessible through a hinged wire screen door 138 through which air may freely circulate for cooling the condenser coils of the refrigerating unit. The compressed and cooled refrigerating medium is supplied to a heat exchange device 140 through a conduit 142. The heat exchange device comprises the usual evaporator coils which surround a casing containing a circuitous air passageway.

Air is circulated through the circuitous passageway in the heat exchange device 140 by a blower 144 driven by a motor 146. The blower draws air from the bottom of the food storage chamber 32 through a pipe 148, and discharges the air into the heat exchange device through a pipe 150. From the heat exchange device the cooled air is conveyed through a pipe 152 to a stream dividing Y fitting 154. Apertured distributing pipes 156 and 158 are connected to the arms of the Y fitting 154 and substantially equalize the distribution of cold air throughout the top of the food compartment. Inasmuch as all of the carriers are reticulated or perforated, they afford but little resistance to the free flow of the cool air around the packages contained therein and as a result the food packages are rapidly cooled and maintained at the desired low temperature as long as they are retained in the cabinet. The refrigerating medium, after being partially warmed in the heat exchange device 140, is discharged through a conduit 160 which encircles the casing of the blower 144 to pre-cool the air circulated by the latter, the refrigerating medium being returned to the refrigerating unit 134 through the conduit 162.

The heat exchange device 140 is accessible for defrosting through a door 164. Since very little atmospheric air will be admitted to the food compartment upon opening of the doors 88, the amount of frosting taking place in the heat exchange device 140 will be very small, so that it will be necessary to defrost the heat exchange device only upon relatively infrequent occasions.

The refrigerating unit 134, provided with a compressor motor 166, is shown diagrammatically in Figure 8 as being supplied with current from the line 124 through an overload circuit breaker 168. The operation of the blower motor 146 is controlled by a thermostatically operated switch 170 which closes the circuit to the blower motor whenever the temperature within the food compartment of the cabinet rises above a predetermined maximum. A relay 172 having armature-actuated switches 174 and 176 is connected in shunt with the blower motor 146 and controls circuits to signal lights 178 and 180 which may be colored red and green respectively, the circuit being so arranged that when the relay 172 is energized, the red light at 178 is illuminated and when the relay 172 is de-energized, the green light 180 will be illuminated. The lights 178 and 180 may be located in any suitable position where they may be readily observed by an attendant to check the operation of the system. The red light of course indicates that the temperature in the food compartment is above the maximum permitted temperature and that the blower motor is in operation to cause circulation of the air in the food compartment through the heat exchange device 140 and that the temperature in the food compartment is thus in the course of being lowered.

On the other hand, the illumination of the green light 180 indicates to the attendant that the temperature in the food compartment is below the permitted maximum temperature and that the apparatus is operating satisfactorily.

In operation, the carrier driving motor will operate continuously to move the carriers in their circuitous path as long as the switch 126 is closed. Normally this switch will be closed by the attendant at the start of the business day and will be opened at the end of the day. On the other hand, the compressor motor and blower motor are connected to the line 124 independently of the switch 126 so that these motors will operate continuously to maintain the food compartment of the cabinet at the desired low temperature.

Whenever any of the doors 88 is opened by a customer or clerk to remove a package of food, the associated switch 112–118 will, of course, be opened, and thus, through the relay 122 and mercury switch 128, open the circuit to the driving motor 78 whereupon the carriers will be substantially instantaneously stopped, permitting the customer or clerk to remove the desired packages of food from the carrier which will then be in substantial registry with the door. The movement of the carriers is sufficiently slow that it is unnecessary to provide any special means for causing absolute registry of the carrier with the door. The customer can readily open the door at the proper time to stop the drive motor at a time when the desired carrier is in registry with the door. The fact that the customer can observe the position of the indicating drum, as well as observe the sample food packages through the windows 92, makes it a simple and easily performed operation for the customer to open the door 88 at the time necessary to enable him to gain access to the desired carrier.

The circulation of air in the food compartment by means of the blower 144 assures the cooling of the food in the compartment in a minimum amount of time, since the cold air is forcibly ejected from the pipes 156, 158 against the food packages and by its impingement thereagainst assures rapid cooling of the food as compared with the usual type of cabinet wherein convection of the air cooled by the evaporator coil is relied upon to assure uniform removal of heat from all portions of the container. The blower 144 is of sufficiently great capacity to assure very rapid circulation of the air content of the food compartment thus assuring the maintenance of a uniformly low temperature throughout all parts of the food compartment. Furthermore, the blower 144 is preferably of a type which is capable of building up a pressure of a few pounds per square inch. Thus the air in the heat exchange device is under slight compression, facilitating the transfer of the heat therefrom to the cooled surfaces of the heat exchange device and resulting in slight additional cooling of the air as it expands from the apertures in the distributing pipes 156, 158.

While I have shown and described a particular embodiment of my invention, it will be apparent to those skilled in the art that numerous variations and modifications thereof may be made without departing from the basic principles of the invention. I therefore desire in the following claims to include within the scope of my invention all such similar and modified forms and constructions by which substantially the results of my invention may be obtained by substantially the same means.

I claim:

1. In a refrigerating cabinet, the combination of a food compartment, a conveyor system within said cabinet, said conveyor system comprising a plurality of carriers, a plurality of doors in said cabinet for gaining access to said compartment, motor operated means for advancing said carriers in a circuitous path behind said doors, and means operated by any one of said doors upon opening thereof to stop the travel of said carriers.

2. The combination set forth in claim 1 in which the means for advancing said carriers includes an electric motor and in which the means for stopping the travel of said carriers comprises a switch in the supply circuit for said electric motor which is opened upon opening any one of said doors.

3. The combination set forth in claim 1 in which said carriers have compartments for holding samples of the food conveyed, and in which the walls of the said cabinet include a plurality of spaced transparent sheets through which said samples may be observed and which provide heat insulation, said sheets being disposed along the line of travel of said carriers and extending a greater distance along the line of travel of said carriers than said doors, whereby said samples may be observed immediately before the corresponding compartment passes behind the corresponding door.

4. In a refrigerated food storage apparatus for use in retail stores and the like, the combination of a cabinet having a food compartment, a plurality of doors arranged in a vertical row for obtaining access to said compartment, a plurality of food carriers movable past said doors, each of said carriers having a plurality of sections in horizontal alignment respectively with said doors, electric motor driven means for moving said carriers past said doors, a relay for supplying current to said motor, a switch cooperating with each of said doors opened upon opening of the adjacent door, and a circuit connecting said switches and the winding of said relay in series.

5. In a refrigerated food cabinet for use in retail stores and the like, the combination of a cabinet having a food compartment, a plurality of relatively small doors for obtaining access to said compartment, a plurality of food carriers movable past said doors, electric motor driven means for moving said carriers past said doors, switches connected in series for controlling the supply of current to said motor, and means cooperating with each of said doors operable to open said switch upon opening of the adjacent door.

6. In a refrigerating cabinet, the combination of a food compartment in said cabinet, a conveyor system within said compartment, said conveyor system comprising a plurality of vertical carriers having vertically spaced shelves, means for advancing said carriers in a circuitous path, a plurality of doors in said cabinet in positions to register with the spaces above the shelves of said carriers for gaining access thereto, and means operated by any one of said doors upon opening thereof to interrupt the travel of said carriers.

7. The combination set forth in claim 1 in which the means for advancing said carriers past said doors includes an electric motor and in which the means for stopping the travel of said carriers comprises a switch in the supply circuit for said electric motor, a relay magnet for operating said switch, and a plurality of switches connected in series with said relay magnet and operated respectively by any one of said doors.

LEONARD F. CLERC.